United States Patent
Kim

(10) Patent No.: US 6,659,093 B2
(45) Date of Patent: Dec. 9, 2003

(54) SYSTEM AND METHOD FOR TREATING BLOW-BY GAS IN A PCV SYSTEM OF AN INTERNAL COMBUSTION ENGINE

(75) Inventor: In-Tak Kim, Seongnam (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/265,428

(22) Filed: Oct. 4, 2002

(65) Prior Publication Data

US 2003/0070662 A1 Apr. 17, 2003

(30) Foreign Application Priority Data

Oct. 11, 2001 (KR) .......................................... 2001-62710

(51) Int. Cl.[7] .............................................. F02M 25/06
(52) U.S. Cl. ....................................................... 123/572
(58) Field of Search .................. 123/572, 573, 123/574

(56) References Cited

U.S. PATENT DOCUMENTS

| 5,205,265 A | * | 4/1993 | Kashiyama et al. | ........ 123/572 |
| 5,307,784 A | * | 5/1994 | Choma et al. | ................. 13/572 |
| 6,457,462 B2 | * | 10/2002 | Moren | ........................ 123/572 |

* cited by examiner

*Primary Examiner*—Marguerite McMahon
(74) *Attorney, Agent, or Firm*—Pennie & Edmonds LLP

(57) ABSTRACT

A system for treating blow-by gas in a PCV (positive crankcase ventilation) system of an internal combustion engine is provided, which comprises a cut-off valve assembly for selectively opening or closing an air duct, a blow-by gas collecting assembly for collecting blow-by gas inside an air intake passageway and ejecting the collected blow-by gas into an intake manifold such that the blow-by gas is re-burned in a combustion chamber, and a controller for controlling operations of the cut-off valve assembly and the blow-by gas collecting assembly.

10 Claims, 2 Drawing Sheets

SYSTEM AND METHOD FOR TREATING BLOW-BY GAS IN A PCV SYSTEM OF AN INTERNAL COMBUSTION ENGINE

FIELD OF THE INVENTION

The present invention relates in general to pollution control devices in internal combustion engines. In particular, the present invention is directed to a positive crankcase ventilation (PCV) system of an internal combustion engine.

BACKGROUND OF THE INVENTION

Generally, internal combustion engines acquire power by igniting an air-fuel mixture in a combustion chamber, and during the combustion process a lot of emission gases are generated. The emissions gases are then cleaned and emitted through an exhaust system.

Combustion gases produced in the combustion chamber of an internal combustion engine are commonly forced under pressure to flow past the piston rings of the engine and into the engine crankcase. Such gases are called "blow-by" gas, which usually consist at least partially of an air/oil mist. If the blow-by gas is emitted from the engine into the atmosphere, it causes air pollution. In order to satisfy emission regulations, such blow-by gas must be treated. Therefore, PCV systems have been developed for re-burning the blow-by gas.

Typical PCV systems include a PCV hose that connects the cylinder head rocker cover to the intake manifold. Thus, blow-by gas present in a chamber defined between the rocker cover and the cylinder head is drawn into the intake manifold through the PCV hose. The blow-by gas is thus mixed with air in the intake manifold, and the mixed gas flows back into the cylinder to be re-burned.

However, in conventional blow-by gas re-circulating systems, when the engine is rotating, the blow-by gas resides in air intake passageways such as the intake manifold, throttle body, air intake hose, air cleaner, and air duct leading to the outside of the system. Consequently, fuel particles and oil particles in the blow-by gas are accumulated in the air intake passageways. This may cause air pollution, and also degrades engine performance.

SUMMARY OF THE INVENTION

In a preferred embodiment of the present invention, a system for treating blow-by gas in a PCV system of an internal combustion engine comprises a cut-off valve assembly, a blow-by gas collecting assembly, and a controller. The cut-off valve assembly selectively opens or closes an air duct. The blow-by gas collecting assembly collects the blow-by gas inside an air intake passageway and ejects it into an intake manifold such that it is re-burned in a combustion chamber. The controller controls operation of the cut-off valve assembly and the blow-by gas collecting assembly.

Preferably, the cut-off valve assembly comprises a valve plate and an actuator. The valve plate is rotatably disposed in the air duct, and the actuator rotates the valve plate such that a position of the valve plate is changed, the actuator being controlled by a signal input from the controller. It is further preferable that the actuator is a step motor.

It is preferable that the blow-by gas collecting assembly comprises a pump, a gas reservoir, a first duty-control valve, a second duty-control valve, and a third duty-control valve. The pump is controlled by the controller and it draws the blow-by gas. The pump is connected to the air duct between the cut-off valve and an air cleaner through a first collecting hose and to an air intake hose between the air cleaner and a throttle body through a second collecting hose. The gas reservoir temporarily stores the collected blow-by gas; it is connected to the pump through a connecting hose and to the air intake hose through an ejecting hose. The first, second, and third duty-control valves are respectively disposed in the first and second collecting hoses and the connecting hose, each duty-control valve being controlled by signals input from the controller.

In another preferred embodiment of the present invention, the system further comprises a first pressure sensor and a second pressure sensor. The first and second pressure sensors respectively detect pressures inside the air duct and the air intake hose, and generate corresponding signals. The controller receives the signals of the first and second pressure sensors and controls the first, second, and third duty-control valves on the basis of the signals.

In an alternative preferred embodiment of the present invention, the system further comprises a breather hose and a PCV hose. The breather hose communicates an air intake hose and a rocker cover, and the PCV hose communicates a chamber under the rocker cover and an intake manifold, a PCV valve being disposed in the PCV hose.

Preferably, the controller generates a signal to close the air duct, and sends the signal to the cut-off valve assembly. It is also preferable that the controller generates signals for operating the pump and signals for opening the first and second duty-control valves, if an ignition-on signal is detected. The controller also may determine whether conditions for opening the air duct exist, the conditions including that a pressure inside the air duct is lower than atmospheric pressure and higher than a pressure inside the air intake hose using the signals input from the first and second pressure sensors. Signals for opening the air duct to the cut-off valve assembly, if the conditions for opening the air duct exist, are generated by the controller.

The controller preferably determines whether an engine speed is higher than 0 rpm and generates signals for opening the third duty-control valve if the engine speed is higher than 0 rpm.

Signals are also generated for stopping the pump and releasing duty-controls on the first and second duty-control valves. Whether the engine speed is equal to 0 rpm may be determined by the controller and then signals for closing the air duct to the cut-off valve assembly are generated if an engine speed is equal to 0 rpm.

In another preferred embodiment of the present invention, the system for treating blow-by gas in a PCV (positive crankcase ventilation) system of an internal combustion engine comprises an air duct opening/closing assembly, a pump, a gas reservoir, a first duty-control valve, a second duty-control valve, a third duty-control valve, a first pressure sensor, a second pressure sensor, and a controller. The air duct opening/closing assembly is disposed in an air duct before an air cleaner, the air duct opening/closing member selectively opening/closing the air duct. The pump collects blow-by gas from the air duct and an air intake hose, the pump being respectively connected to the air duct and the air intake hose through a first collecting hose and a second collecting hose. The gas reservoir temporarily stores the collected gas, the gas reservoir being connected to the pump through a connecting hose and also being connected to the air intake hose through an ejecting hose. The first duty-control valve is disposed in the first collecting hose, the second duty-control valve is disposed in the second collecting hose, and the third duty-control valve is disposed in the ejecting hose. The first pressure sensor detects a pressure inside the air duct and generates a corresponding signal, and the second pressure sensor detects a pressure inside the air intake hose and generates a corresponding signal. The controller controls operation of the pump and performs duty-control of the first, second, and third duty-control valves on the basis of the signals input from the first and second pressure sensors as well as engine operating conditions.

In another preferred embodiment of the present invention, the method for treating blow-by gas employs a PCV (positive crankcase ventilation) system of an internal combustion engine. The system preferably includes an air duct opening/closing assembly disposed in an air duct before an air cleaner. The air duct opening/closing member selectively opens/closes the air duct. A pump collects blow-by gas from the air duct and air intake hose. The pump is preferably respectively connected to the air duct and the air intake hose through a first collecting hose and a second collecting hose. A gas reservoir temporarily stories collected gas, the gas reservoir being connected to the pump through a connecting hose and also being connected to the air intake hose through an ejecting hose. A first duty-control valve is disposed in the first collecting hose. A second duty-control valve is disposed in the second collecting hose. And a third duty-control valve is disposed in the ejecting hose. A first pressure sensor detects pressure inside the air duct and generates a corresponding signal. A second pressure sensor detects pressure inside the air intake hose and generating a corresponding signal. A controller controls operation of the pump and performs a duty-control for the first, second and third duty-control valves on the basis of the signals input from the first and second pressure sensors and engine operating conditions.

Preferably, the method comprises operating the pump and opening the first and second duty-control valves, if an ignition-on signal is detected; determining whether conditions for opening the air duct exist, the conditions including that a pressure inside the air duct is lower than atmospheric pressure and higher than a pressure inside the air intake hose, using the signals input from the first and second pressure sensors; opening the air duct by controlling the cut-off valve assembly if the conditions for opening the air duct exist; determining if an engine speed is higher than 0 rpm; opening the third duty-control valve if the engine speed is higher than 0 rpm; and stopping the pump and releasing duty-controls on the first and second duty-control valves. More preferably, the method further comprises determining if an engine speed is equal to 0 rpm; and generating signals for closing the air duct to the cut-off valve assembly if the engine speed is equal to 0 rpm.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
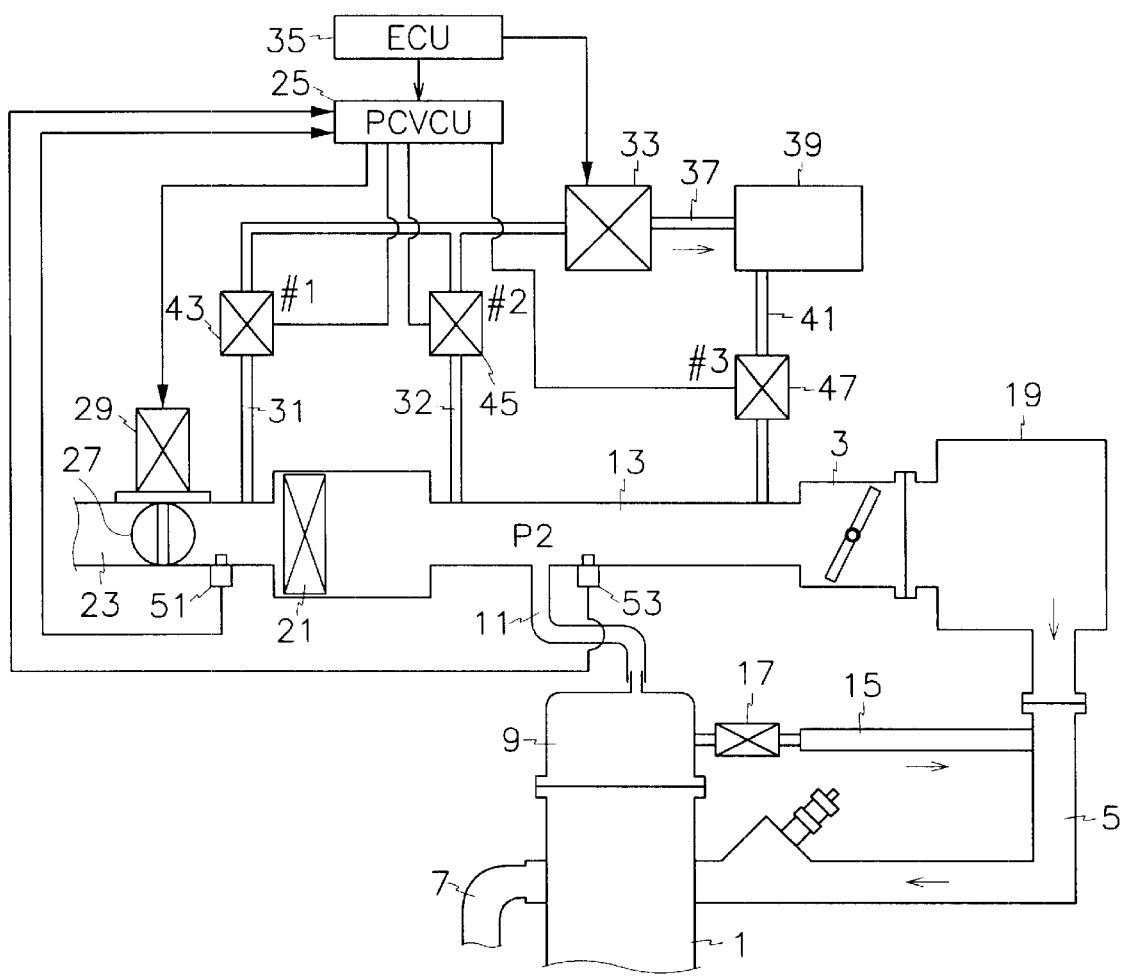
FIG. 1 schematically illustrates a system for treating blow-by gas in a PCV system of an internal combustion engine according to an embodiment of the present invention.

As shown in FIG. 1, the system for treating blow-by gas according to the present invention can be applied to the PCV system that comprises an intake manifold 5 and an exhaust manifold 7, respectively mounted on each side of a cylinder head 1. The intake manifold 5 is connected to a throttle body 3 through a surge tank 19, and a rocker cover 9, which protects a cam assembly (not shown) from foreign substances, is mounted on top of the cylinder head 1.

A breather hose 11 for drawing air is connected between the rocker cover 9 and an air intake hose 13 that is located before the throttle body 3. Further, a PCV hose 15 for re-circulating blow-by gas is connected between the rocker cover 9 and the intake manifold 5. A PCV valve 17 is disposed in a passage of the PCV hose.

An air duct cut-off valve assembly is provided in an air duct 23 that is located before an air cleaner 21. The air duct cut-off assembly opens or closes the air duct in response to signals input from a PCV control unit 25, which carries the symbol PCVCU.

The air duct cut-off valve assembly includes a cut-off valve plate 27 and a step motor 29. The cut-off valve plate 27 is rotatably mounted in the passage of the air duct 23 such that the passage of the air duct 23 can be opened or closed by the rotation of the cut-off valve plate 27.

The step motor 29 rotates the cut-off valve plate 27 in response to a signal of the PCV control unit 25. In this embodiment, while the step motor 29 is employed, an arbitrary actuator can be employed for rotating the cut-off valve plate 27 by a person having ordinary skill in this technical field.

A pump 33 is connected to the air duct 23 at a position between the cut-off valve plate 27 and the air cleaner 21 through a first collecting hose 31. Further, the pump 33 is also connected to the air intake hose 13 through a second collecting hose 32. The pump 33 is operated by a signal input from an engine control unit (ECU) 35. Preferably, control units 25 and 35 comprise processors and associated hardware and software as may be selected and programmed by a person of ordinary skill in the art to execute the control functions as described herein.

Pump 33 is connected to a gas reservoir 39 through a connecting hose 37, and the gas reservoir 39 is connected to the air intake hose 13 through an ejecting hose 41.

A first duty-control valve 43 is disposed in the first collecting hose 31 connecting the pump 33 and the air duct 23. The first duty-control valve 43 is duty-controlled by a control signal of the PCV control unit 25 so that an opening ratio of the collecting hose 31 is regulated. Similarly, a second duty-control valve 45 is disposed in the second collecting hose 32 connecting the pump 33 and the air intake hose 13. The second duty-control valve 45 is duty-controlled by a control signal of the PCV control unit 25 so that an opening ratio of the collecting hose 32 is regulated. A third duty-control valve 47 is disposed in the ejecting hose 41 connecting the gas reservoir 39 and the air intake hose 13. The third duty-control valve 47 is duty-controlled by a control signal of the PCV control unit 25 so that an opening ratio of the ejecting hose 41 is regulated.

A first pressure sensor 51 is provided in the air duct 23, for detecting pressure in a chamber between the cut-off valve plate 27 and the air cleaner 21. The first pressure sensor 51 transmits a signal corresponding to the detected pressure to the PCV control unit 25. A second pressure sensor 53 is provided in the air intake hose 13. The second pressure sensor 53 detects pressure inside the air intake hose 13 and transmits a signal corresponding to the detected pressure to the PCV control unit 25.

Though the system in this embodiment preferably comprises two control units, that is, the engine control unit 35 and the PCV control unit 25, it is quite easy for a person having ordinary skill in the art to devise a single control unit for performing the above-stated functions.

Figure 2:
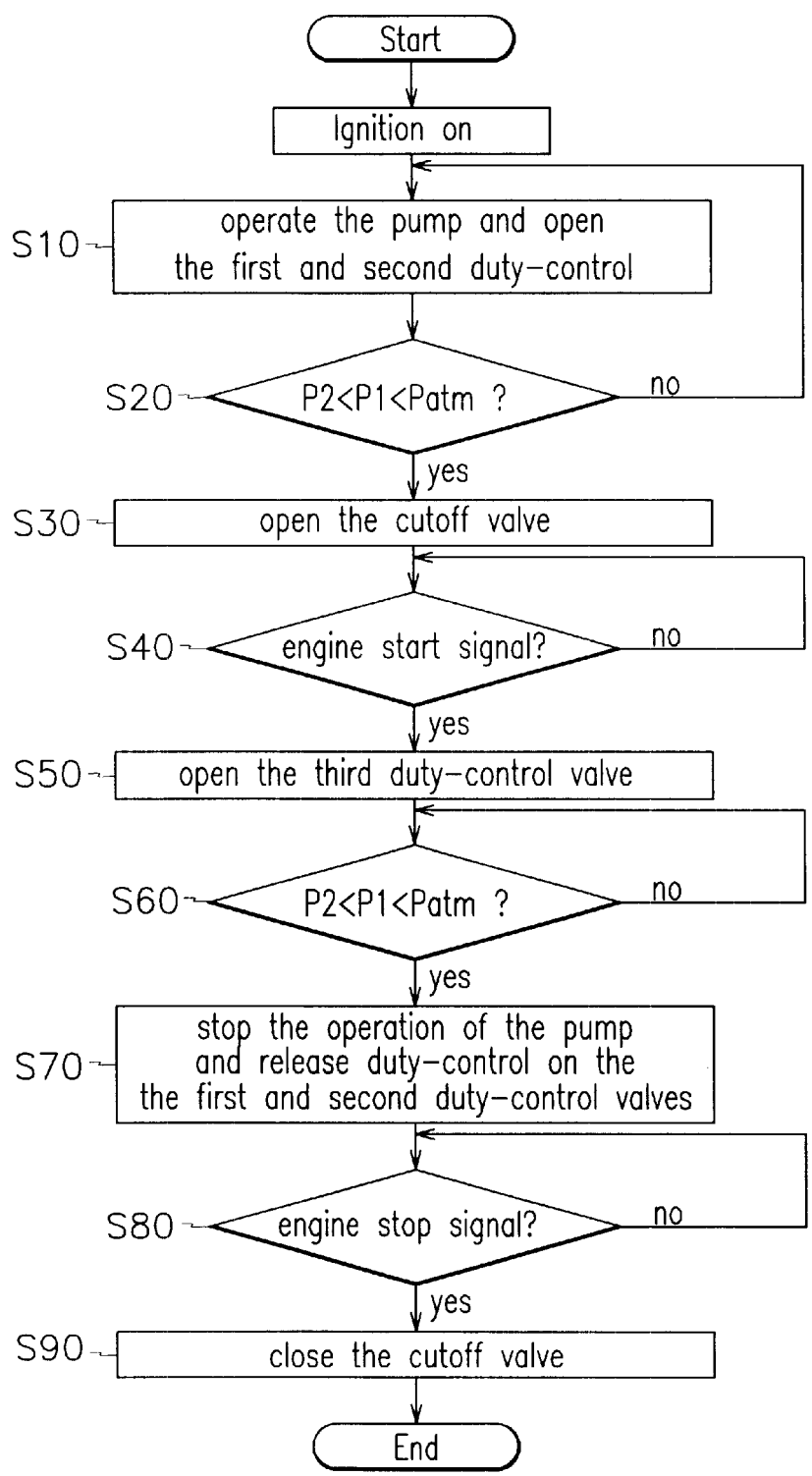
FIG. 2 is a flowchart showing a method for treating blow-by gas in a PCV system of an internal combustion engine according to an embodiment of the present invention.

Referring to FIG. 2, a method for treating blow-by gas that can be applied to the above-stated system is explained.

When an ignition-on signal is generated, the ECU 35 generates a signal for operating the pump 33, and the PCV control unit 25 generates a signal for opening the first and second duty-control valves 43 and 45 (S10). Opening ratios of the first and second duty-control valves 43 and 45 are determined such that the intake air does not reversibly flow considering a pressure difference between the air intake hose 13 and the air duct 23.

When the pump 33 operates, the blow-by gas residing in the intake passage is conveyed into the gas reservoir 39 through the collecting hose 31 and the connecting hose 37. The gas reservoir 39 temporarily stores the conveyed blow-by gas. Then, on the basis of signals input from the first and second pressure sensors 51 and 53, the PCV control unit 25 determines whether pressure P1 inside the air duct 23 is lower than the atmospheric pressure $P_{atm}$ and is higher than pressure P2 inside the air intake hose 13 (S20).

If the decision is NO in step S20, the procedure returns to step S10. On the other hand, if the decision is YES in step S20, the PCV control unit 25 transmits a signal for opening the air duct 27 to the step motor 29 (S30).

The PCV control unit 25 determines if an engine start signal occurs on the basis of a signal of the ECU 35 (S40), and if so, the PCV control unit 25 generates a signal for opening the third duty-control valve 47 (S50). When the third duty-control valve 47 is opened, the blow-by gas stored in the gas reservoir 39 flows into the air intake hose 13 and mixes with imbibed air. Thus, the blow-by gas is re-burned in a combustion chamber. Here, the opening ratio of the third duty-control valve 47 is regulated such that the intake air does not reversibly flow considering a pressure difference between the air intake hose 13 and the air duct 23.

After opening the third duty-control valve 47, the PCV control unit 47 determines whether a pressure P1 inside the air duct 23 is lower than atmospheric pressure $P_{atm}$ and higher than a pressure P2 inside the air intake hose 13 on the basis of signals input from the first and second pressure sensors 51 and 53 (S60). If so, the PCV control unit 25 generates a signal for stopping the operation of the pump 33 and releases duty-control on the first and second duty-control valves 43 and 45 (S70). Then, the opening ratios of the first and second duty-control valves 43 and 45 are not regulated by duty-control signals, and thereby air flows by pressure difference. Then, the PCV control unit 25 determines whether the engine is stopped on the basis of a signal from the ECU 35 (S80). If it is determined that the engine is stopped, the PCV control unit generates a signal for closing the cut-off valve plate 27 to the step motor 29 (S90). Therefore, while the engine is maintains in a stopped state, the passage of the air duct 27 is closed by the cut-off valve. Consequently, the blow-by gas is prevented from escaping from the engine.

As above-stated, in the system and method for treating the blow-by gas in the PCV system, the air duct is closed during an engine-stopped state such that the blow-by gas is prevented from leaking from the air duct; and during engine starting, the blow-by gas is temporarily collected and then ejected into the combustion chamber. Consequently, particles contained in the blow-by gas are not accumulated in the air intake passage even in a state of the engine being stopped, and the leakage of the blow-by gas can be prevented.

Although preferred embodiment of the present invention have been described in detail hereinabove, it should be clearly understood that many variations and/or modifications of the basic inventive concepts herein taught which may appear to those skilled in the present art will still fall within the sprit and scope of the present invention, as defined in the appended claims.

What is claimed is:

1. A system for treating blow-by gas in a positive crankcase ventilation system of an internal combustion engine, the system comprising:
    a cut-off valve assembly for selectively opening or closing an air duct;
    a blow-by gas collecting assembly for collecting blow-by gas inside an air intake passageway and ejecting the collected blow-by gas into an intake manifold such that the blow-by gas is re-burned in a combustion chamber; and
    a controller for controlling operations of the cut-off valve assembly and the blow-by gas collecting assembly.

2. The system of claim 1, wherein the cut-off valve assembly comprises:
    a valve plate rotatably disposed in the air duct; and
    an actuator for rotating the valve plate such that a position of the valve plate is changed, the actuator being controlled by a signal input from the controller.

3. The system of claim 2, wherein the actuator is a step motor.

4. The system of claim 1, wherein the blow-by gas collecting assembly comprises:
    a pump for drawing the blow-by gas, the pump being connected to the air duct between the cut-off valve and an air cleaner through a first collecting hose and being connected to an air intake hose between the air cleaner and a throttle body through a second collecting hose, the pump being controlled by the controller;
    a gas reservoir for temporarily storing the collected blow-by gas, the gas reservoir being connected to the pump through a connecting hose and being connected to the air intake hose through an ejecting hose; and
    a first, a second, and a third duty-control valve respectively in the first and second collecting hoses, and the connecting hose, each duty-control valve being controlled by signals input from the controller.

5. The system of claim 4, further comprising:
    a first pressure sensor for detecting a pressure inside the air duct and generating a corresponding signal; and
    a second pressure sensor for detecting a pressure inside the air intake hose and generating a corresponding signal,
    wherein the controller receives the signals of the first and second pressure sensors and controls the first, second, and third duty-control valves on the basis of the signals.

6. The system of claim 1, further comprising:
    a breather hose for communicating an air intake hose and a rocker cover; and a PCV hose for communicating a chamber under the rocker cover and an intake manifold, a PCV valve being disposed in the PCV hose.

7. The system of claim 1, wherein the controller generates a signal to close the air duct and sends the signal to the cut-off valve assembly.

8. The system of claim 5, wherein the controller is programmed to perform:

generation of signals for operating the pump and for opening the first and second duty-control valves, if an ignition-on signal is detected;

determination of whether conditions for opening the air duct exist, the conditions including that a pressure inside the air duct is lower than atmospheric pressure and higher than a pressure inside the air intake hose, using the signals input from the first and second pressure sensors;

generation of signals for opening the air duct to the cut-off valve assembly if the conditions for opening the air duct exist;

determination of whether an engine speed is higher than 0 rpm;

generation of signals for opening the third duty-control valve if the engine speed is higher than 0 rpm;

generation of signals for stopping the pump and releasing duty-controls on the first and second duty-control valves;

determination of whether an engine speed is equal to 0 rpm; and generation of signals for closing the air duct to the cut-off valve assembly if an engine speed is equal to 0 rpm.

9. A method for treating blow-by gas using a positive crankcase ventilation system of an internal combustion engine including an air duct opening/closing assembly disposed in an air duct before an air cleaner, the air duct opening/closing member selectively opening/closing the air duct; a pump for collecting blow-by gas from the air duct and an air intake hose, the pump being respectively connected to the air duct and the air intake hose through a first collecting hose and a second collecting hose; a gas reservoir for temporarily storing the collected gas, the gas reservoir being connected to the pump through a connecting hose and also being connected to the air intake hose through an ejecting hose; a first duty-control valve disposed in the first collecting hose; a second duty-control valve disposed in the second collecting hose; a third duty-control valve disposed in the ejecting hose; a first pressure sensor for detecting a pressure inside the air duct and generating a corresponding signal; a second pressure sensor for detecting a pressure inside the air intake hose and generating a corresponding signal; and a controller for controlling an operation of the pump and performing a duty-control of the first, second, and third duty-control valves on the basis of the signals input from the first and second pressure sensors and engine operating conditions, the method comprising:

operating the pump and opening the first and second duty-control valves, if an ignition-on signal is detected;

determining whether conditions for opening the air duct exist, the conditions including that a pressure inside the air duct is lower than atmospheric pressure and higher than a pressure inside the air intake hose, using the signals input from the first and second pressure sensors;

opening the air duct by controlling the cut-off valve assembly if the conditions for opening the air duct exist;

determining if an engine speed is higher than 0 rpm;

opening the third duty-control valve if the engine speed is higher than 0 rpm; and stopping the pump and releasing duty-controls on the first and second duty-control valves.

10. The method of claim 9, further comprising:

determining if an engine speed is equal to 0 rpm; and generating signals for closing the air duct to the cut-off valve assembly if the engine speed is equal to 0 rpm.

* * * * *